(12) United States Patent
Nissov et al.

(10) Patent No.: US 7,274,880 B2
(45) Date of Patent: Sep. 25, 2007

(54) RAMAN ASSISTED EDFA SYSTEM AND METHOD

(75) Inventors: Morten Nissov, Ocean, NJ (US); Alexei A. Pilipetskii, Colts Neck, NJ (US); Ekaterina Golovchenko, Colts Neck, NJ (US); Jonathan Nagel, Brooklyn, NY (US); Sergey Ten, Horsehead, NY (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 216 days.

(21) Appl. No.: 09/991,126

(22) Filed: Nov. 16, 2001

(65) Prior Publication Data

US 2005/0180757 A1   Aug. 18, 2005

Related U.S. Application Data

(60) Provisional application No. 60/249,346, filed on Nov. 16, 2000, provisional application No. 60/249,347, filed on Nov. 16, 2000.

(51) Int. Cl.
*H04B 10/00*   (2006.01)
(52) U.S. Cl. ...................................... 398/160
(58) Field of Classification Search ............... 398/140, 398/147–160, 79, 81, 94, 173; 359/333, 359/334
See application file for complete search history.

(56) References Cited

U.S. PATENT DOCUMENTS 5,883,736 A    3/1999 Oshima et al.
6,108,123 A *  8/2000 Kinoshita .................. 359/337
6,163,636 A   12/2000 Stentz et al.
6,172,803 B1   1/2001 Masuda et al.
6,178,038 B1*  1/2001 Taylor et al. ............ 359/337.5
6,263,139 B1   7/2001 Kawakami et al.
6,292,288 B1   9/2001 Akasaka et al.
6,466,362 B1* 10/2002 Friedrich .................. 359/334

(Continued)

FOREIGN PATENT DOCUMENTS

EP           0903877          3/1999

(Continued)

OTHER PUBLICATIONS

Masuda et al, "Wide-Band and Gain-Flattened Hybrid Fiber Amplifier Consisting of an EDFA and a Multiwavelength Pumped Raman Amplifier", IEEE Photonics Technology Letters, vol. 11, No. 6, Jun. 1999, pp. 647-649.

(Continued)

*Primary Examiner*—Jason Chan
*Assistant Examiner*—Quan-Zhen Wang
(74) *Attorney, Agent, or Firm*—Grossman, Tucker, Perreault & Pfleger, PLLC

(57) ABSTRACT

A system, amplifier and method are provided for amplifying an optical signal in an optical communications system where spans between amplifiers may vary. The system includes a Raman amplifier variable gain portion and an EDFA gain portion. The amount of Raman amplifier gain is chosen to trade off accumulation of noise with accumulation of multi-path interference. This variable Raman gain is used to equalize the loss of each span so that the amount of optical power supplied at the input of the EDFA gain portion is substantially constant throughout the system.

11 Claims, 3 Drawing Sheets

U.S. PATENT DOCUMENTS

| | | | |
|---|---|---|---|
| 6,785,042 B1 * | 8/2004 | Onaka et al. | 359/334 |
| 2003/0058523 A1 * | 3/2003 | Islam | 359/334 |

FOREIGN PATENT DOCUMENTS

| | | |
|---|---|---|
| JP | 05066353 | 3/1993 |
| JP | 07154338 | 6/1995 |
| JP | 09197452 | 7/1997 |
| JP | 2000314902 | 11/2000 |
| WO | 9842088 | 9/1998 |
| WO | WO9943107 | 8/1999 |

OTHER PUBLICATIONS

English translation of Japanese Examiner's Letter dated Oct. 23, 2006 received in corresponding Japanese Patent Application Serial No. 2003-514721 (5 pages).

* cited by examiner

RAMAN ASSISTED EDFA SYSTEM AND METHOD

CROSS REFERENCE TO RELATED APPLICATIONS

The present application claims the benefit of U.S. Provisional Appl. Ser. No. 60/249,346 filed Nov. 16, 2000, entitled "Amplifier Design for Raman Assisted EDFA Systems," the teachings of which are herein incorporated by reference, and the present application herein incorporates by reference the teachings of commonly assigned U.S. Provisional Appl. Ser. No. 60/249,347, also filed Nov. 16, 2000, entitled "Terrestrial System Design," and its related U.S. patent application Ser. No. 09/991,154, being filed concurrently with the present patent application.

FIELD OF THE INVENTION

The present invention relates to optical telecommunications systems. More particularly, the present invention relates to Raman assisted EDFA amplification in long haul and ultra-long haul optical telecommunications systems.

BACKGROUND OF THE INVENTION

The maximum distances optical signals can travel through optical fiber before degrading to the point of being undetectable by a receiver is limited by, among other things, power loss or attenuation caused by dispersion, scattering, absorption and bending. Optical amplifiers are employed to reduce or minimize power loss, especially in long haul systems, i.e., about 200 to 600 km, and ultra-long haul (ULH) systems, i.e., greater than about 2,000 km.

Transmission systems may include a series of optical amplifiers periodically spaced along the fiber route between the transmitter and the receiver. These amplifiers provide the necessary optical signal power.

At relatively high optical signal power, optical fiber exhibits nonlinearities such as phase shifts of the optical signal. Specifically, because modulated optical signals include different wavelengths, these different portions propagate along the transmission fiber at different velocities due to dispersion properties inherent in the fiber media. After propagation over a given distance, shorter wavelengths may overtake and become superimposed on longer wavelengths causing amplitude distortion. This is known as chromatic dispersion.

These and other factors are of particular interest in ULH telecommunication systems where, given the relatively long distances, the systems are susceptible to noise and pulse distortion. Therefore, the optical amplifiers must amplify sufficiently to raise the SNR to a level where a receiver can detect an optical signal but not be so high powered as to create intolerable nonlinearities.

Lumped rare earth doped fiber optic amplifiers such as erbium doped fiber amplifiers (EDFAs) are used in ULH optical fiber telecommunications systems. In custom systems, EDFA gains are matched to the fiber span losses to produce low noise amplified optical signals along the entire transmission path. In addition, the spans between amplifiers are preset at approximately the same lengths—between about 40 to 50 km—so that the loss per span is substantially consistent throughout the system.

Amplifying ULH terrestrial transmission systems and maintaining appropriate gain and low noise, by contrast, is somewhat more challenging. For example, ULH terrestrial systems are plagued with large span loss variations and daily and seasonal temperature fluctuations. Furthermore, unlike custom built submarine systems, terrestrial systems often have to be designed using existing fiber in the ground, unmatched and with unknown fiber characteristics. This embedded fiber base is typically non-zero dispersion shifted fiber (NZ-DSF) with a dispersion of about 2-4 ps/nm/km. Significant dispersion, therefore, may accumulate over long transmission distances.

In addition, terrestrial systems are typically designed with wide varying amplifier spacings of about 30 to 110 km. The associated span loss is very high and inconsistent. In ULH systems, the longer spans generally cause increased noise accumulation. Similarly, the nonlinearities limit the amount of power that can be launched into the next NZ-DCF span. This complicates the EDFA design and may potentially degrade performance. That is, in an attempt to minimize costs, terrestrial systems typically attempt to use a single, generic EDFA design throughout the entire system, notwithstanding the loss and nonlinearity variations from one span to the next.

Therefore, there is a need for a system and method that account for these variations in the ULH terrestrial systems and provide for optimum launch power and noise performance. There is a further need for an terrestrial system that behaves like a custom built ULH submarine system, where, for example, the input power to each EDFA is consistent throughout the system regardless of the output from the previous EDFA stage and the type and length of each span.

SUMMARY OF INVENTION

Accordingly, the present invention generally provides a system including distributed Raman assisted EDFA's to reduce the increased noise accumulation associated with long and inconsistent terrestrial spans but maintain the appropriate gain from each amplifier.

In accordance with one aspect, there is provided a Raman assisted EDFA hybrid amplifier. The amplifier includes a Raman amplifier variable gain portion, an EDFA gain portion; and an optical attenuator coupled to an output of the EDFA gain portion.

In a preferred embodiment, the amplifier includes at least one dispersion-compensating fiber disposed between the Raman amplifier variable gain portion and the EDFA gain portion. Alternatively, the dispersion-compensating fiber may be disposed within the Raman amplifier variable gain portion itself. If the EDFA gain portion is a multi-stage EDFA, the dispersion-compensating fiber may be disposed between stages of the multi-stage EDFA.

In another preferred embodiment, the Raman portion is configured to provide variable gain, such that the EDFA gain portion has a substantially constant input power. Preferably, the Raman amplifier variable gain ranges from about 1 to 16 dB. Most preferably the maximum Raman gain is about 14 dB. In yet another preferred embodiment, the optical attenuator reduces power from an output of the EDFA gain portion. Most preferably, the attenuator reduces power in 1 dB increments.

Thus, in accordance with this aspect of the present invention, a hybrid amplifier is provided that includes a variable Raman gain source for optimizing the amplifier so that the overall effect of noise accumulation and multi-path interference (caused by multiple Rayleigh scattering) is minimized.

In most preferred embodiments, lumped amplifiers, such as EDFAs, are used with varying span lengths, ranging, for example, from about 30 to about 110 km between amplifiers.

In combination with these EDFAs, there is provided variable Raman gain amplifiers to provide optimum Raman gain depending upon the span in order to choose the maximum Raman gain and thus optimize noise performance and multi-path interference. In a sense the Raman amplifier is configured like a pre-amplifier for the EDFA gain portion.

In another aspect of the present invention, there is provided a method of amplifying an optical signal on an optical fiber communication link. One embodiment of this aspect includes providing a first Raman assisted EDFA hybrid amplifier having a Raman amplifier variable gain portion, an EDFA gain portion, and an optical attenuator coupled to an output of the EDFA gain portion; transmitting the optical signal on the optical fiber communication link through the Raman assisted EDFA hybrid amplifier; amplifying the optical signal through the Raman amplifier variable gain portion; amplifying the optical signal through the EDFA gain portion; and attenuating the output power of the EDFA gain portion.

Several important advantages will be appreciated from the foregoing summary. For example, the EDFA benefits from forward pumping and is capable of taking full advantage of the Raman assist. That is, in combination with variable Raman gain, all the spans are operated with optimum launch powers into longer lossier spans, with an improvement in noise performance and minimal nonlinear effects.

As another advantage, the present invention allows for a single EDFA design to be used, in combination with Raman variable gain, in a system having spans ranging from 30 km to 110 km. This allows for the use of one type of amplifier as a generic building block for terrestrial ULH systems having varying spans.

Additional features and advantages of the invention will be set forth in the description that follows. It is to be understood that both the foregoing general description and the following detailed description are exemplary and are intended to provide further explanation of the invention as claimed.

In the drawings, like reference characters denote similar elements throughout the figures. It is to be understood that various elements of the drawings may not be drawn to scale and may sometimes be purposely distorted for the purposes of illustrating the invention.

DETAILED DESCRIPTION OF THE PREFERRED EMBODIMENTS

Reference will now be made in detail to the present preferred embodiments of the invention, an example of which is illustrated in the accompanying drawings.

Figure 1:
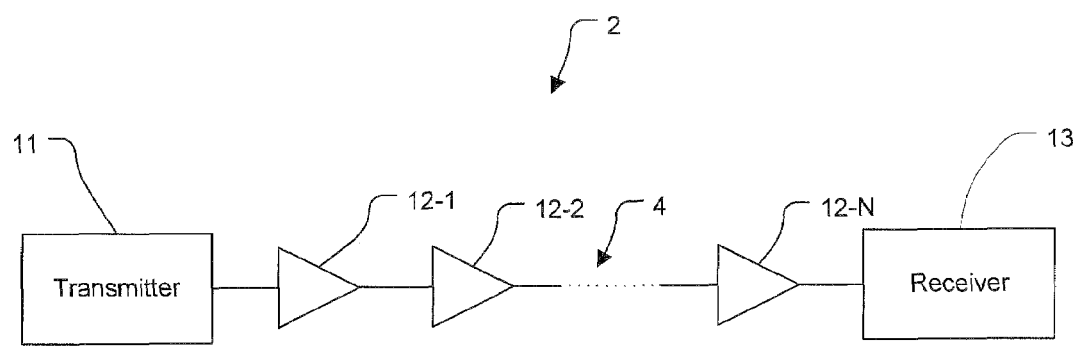
FIG. 1 is a block diagram of an exemplary optical communication system consistent with the present invention.
Figure 1A:
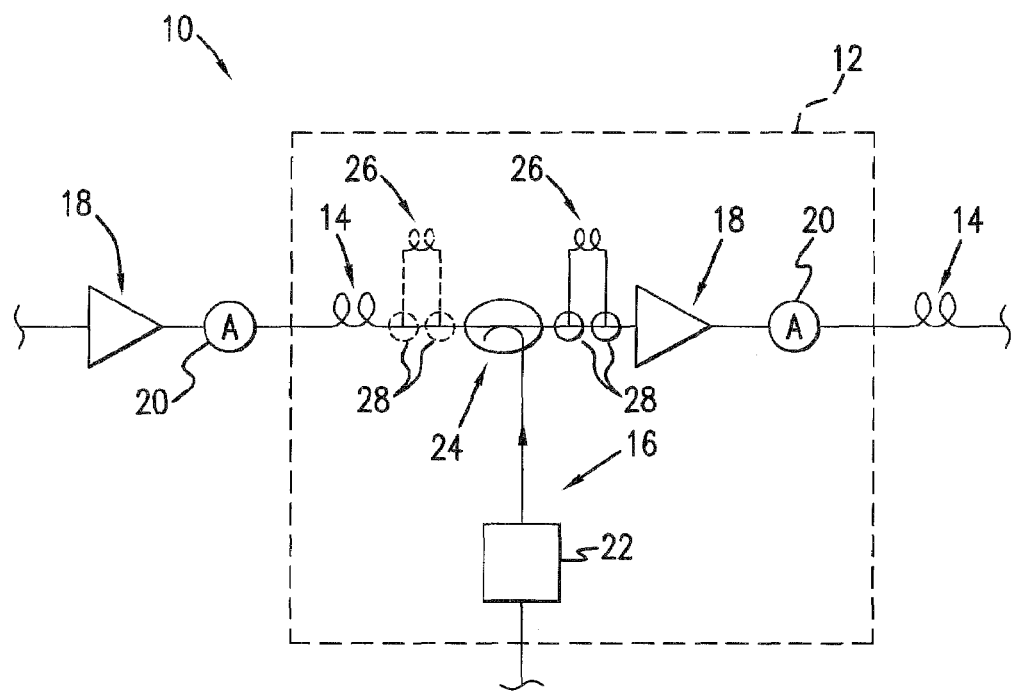
FIG. 1A is a block diagram of an exemplary optical communications system in accordance with one embodiment of the present invention.

FIG. 1 illustrates an optical communication system 2 including a transmitter 11 for transmitting an optical signal, a receiver 13 for detecting the optical signal; and an optical fiber communication link 4 interposed between the transmitter and the receiver. The optical fiber communication link includes a plurality of Raman assisted EDFA hybrid amplifiers 12-1, 12-2 . . . 12-N. An exemplary embodiment of the present invention is shown in FIG. 1A and is designated generally by reference numeral 10. As embodied herein and refining to FIG. 1, a portion of an optical communication system 10, including at least one Raman assisted EDFA hybrid amplifier 12. The hybrid amplifier includes transmission fiber 14, a Raman gain source 16, an EDFA gain source 18, and an optical attenuator 20. The Raman gain source 16 includes a Raman pump module 22, having one or more Raman wavelengths. Each can be independently adjustable through separate attenuators or through bias adjustments. In this preferred embodiment, the Raman gain source 16 is coupled to the transmission fiber 14 by way of coupler 24. The coupler may be any known type such as a WDM module or a 3 dB device. The Raman gain is introduced into the transmission fiber 14 in a counter propagating direction.

Figure 1B:
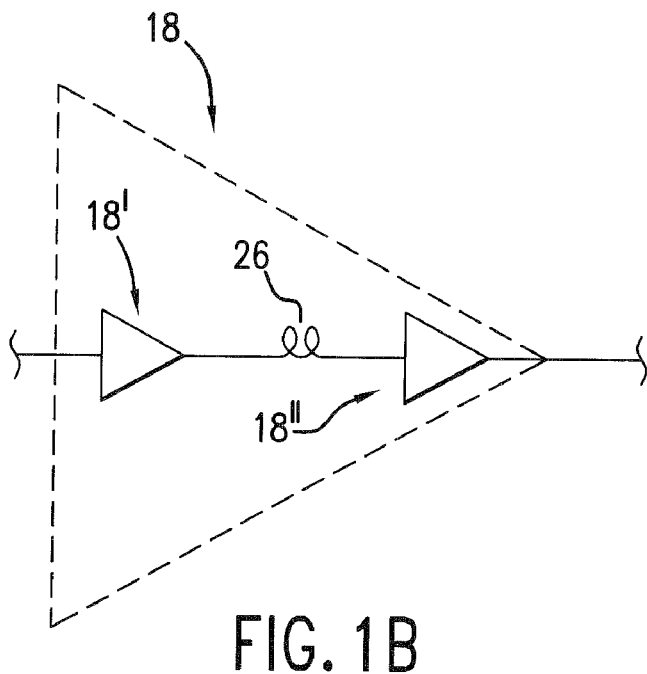
FIG. 1B is a block diagram of a multi-stage EDFA in accordance with an embodiment of the present invention.

The EDFA gain source 18 is provided by any known EDFA module such as a 980 nm pumped EDFA or a 1480 nm pumped EDFA. The EDFA gain source 18 may also consist of a dual stage EDFA or multi-stage EDFA as shown in FIG. 1B. The first EDFA 18' is coupled to the second EDFA 18". Disposed between the EDFAs in the multi-stage EDFA module 18 of FIG. 1B is dispersion-compensation fiber (DCF).

Disposed between the Raman gain source 16 and the EDFA gain source 18 in FIG. 1A is DCF 26. This DCF 26 may alternatively be disposed within the Raman gain source 16 as designated by the dashed lines and shown diposed coupled to the transmission fiber 14 before coupler 24. The DCF 26 is coupled into the transmission fiber 14 in this particular embodiment because this configuration assumes that the transmission fiber 14 is part of a terrestrial systems that is already in the ground and would need to have the DCF coupled in. The DCF couples are of the conventional sort as well.

Those skilled in the art will recognize that the system segment 10 has been depicted as highly simplified for ease of explanation. It is to be understood that the present invention may be incorporated into a wide variety of optical networks, systems and optical amplifiers without departing from the spirit and scope of the invention.

Distributed Raman gain is an important factor in achieving long haul or ULH in a terrestrial system with span lengths extending up to 110 km. The variable Raman gain source 16 acts as a pre-amplifier for the EDFA. System signal-to-noise ratio (SNR) is improved with increasing Raman gain. Unfortunately, interference noise (caused by multiple Rayleigh scattering) is also increased with increasing Raman gain. Raman gain can therefore only be increased until the point where the improvement in SNR is removed by the increase in interference noise. This optimum Raman gain depends on the span length and also might depend on the specific fiber type.

Figure 2:
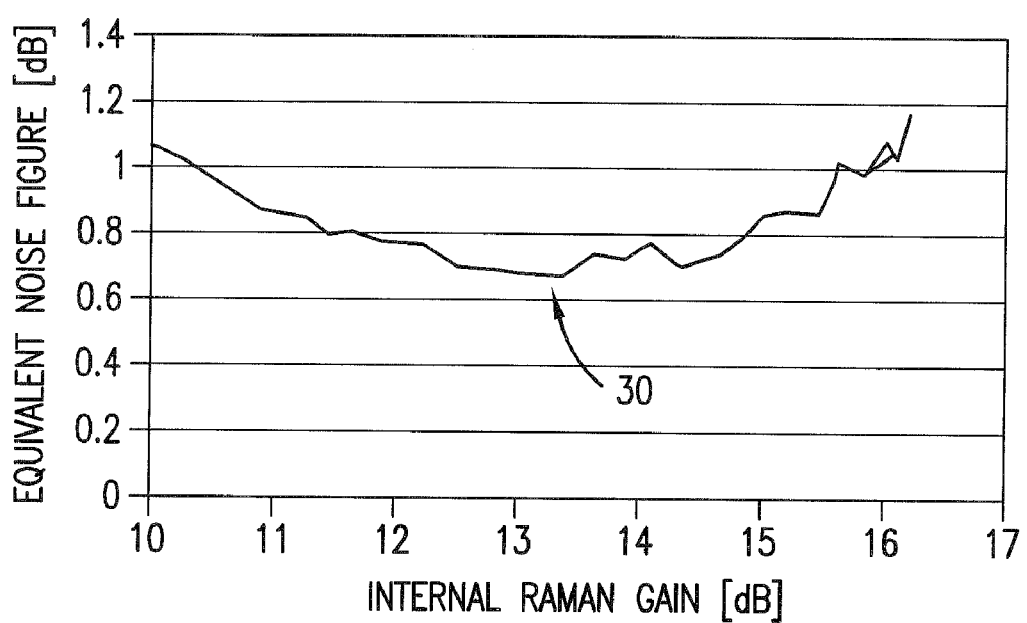
FIG. 2 is a graph showing the equivalent noise figure verses internal Raman gain for a particular 100 km span.

In this regard, FIG. 2 illustrates the equivalent noise figure (dB) versus internal Raman gain (dB) for an exemplary 100 km span. In this example, the equivalent (lumped) single amplifier noise figure is calculated so that an equivalent chain of optical amplifiers with the same span loss, the same equivalent noise figure, and the same path average intensity have the same output SNR as the hybrid (distributed Raman, EDFA) chain. Equivalent noise figures of 3-4 dB means that the hybrid chain is performing as well as a conventional EDFA chain (i.e., no net improvement). The minimum equivalent noise in FIG. 2 is approximately 0.7 dB which is achieved for a Raman gain of about 14 dB. Therefore, a maximum Raman gain of about 14 dB in every span significantly improves the noise performance by about 3.4 dB compared to no Raman gain at all (for 100 km spans). The performance improvement of Raman gain reduces for shorter spans. The largest improvement is achieved for the very long spans.

As mentioned, all long-haul systems, not just ULH systems, are non-linearity limited. The channel launch power is basically chosen as a trade-off between noise accumulation (received SNR) and pulse distortions due to fiber non-linearities. With the same amount of end-to-end non-linear impairment, more power can be launched into a long span than into a short span. The launch power that optimizes (trades-off non-linearities and noise accumulation) system performance is a function of span length, but the optimum path average intensity is usually the same regardless of the span length.

In operation, a ULH system design in accordance with the present invention chooses launch power based on the following span so that optimum power is launched into it. The adjustment is performed by adding loss to the output of the previous EDFA of the Raman assisted EDFA hybrid amplifier, for example, in 1 dB increments. The Raman gain is adjusted either manually or via feedback so that all EDFAs have the same input power.

With the same input and output power for all EDFAs, a major advantage over the known art is realized in that a single code of preferably single-stage medium gain EDFAs can be used with terrestrial systems regardless of the span loss distribution (within practical limits: e.g., 30-110 km). The EDFA gain and output power, the Raman gain upper and lower limits, and upper and lower loss limits can be chosen for a generation or class of systems without custom design for each amplifier in the transmission path. Another advantage of this design is that it significantly simplifies the gain equalization plan.

Figure 3:
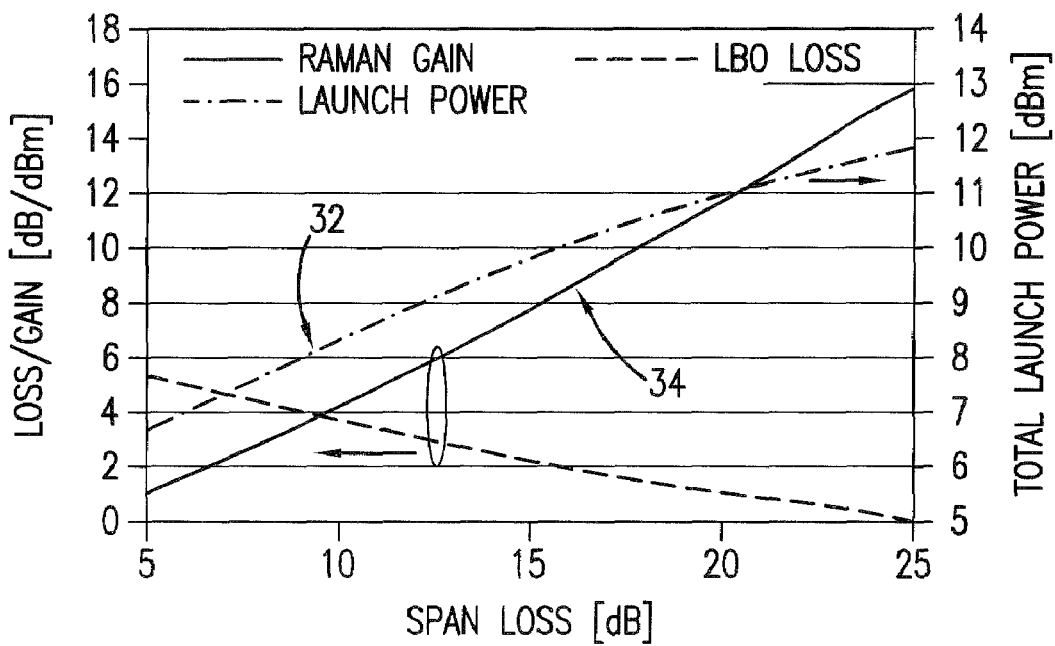
FIG. 3 illustrates an exemplary method of choosing the launch power, EDFA output loss and Raman gain.

Turning now to FIG. 3, which illustrates an exemplary method for choosing the launch power (for equal path average intensity), EDFA output loss, and Raman gain (for constant input power), this Figure shows that span losses from 5-25 dB can be handled by varying launch power 32 from 6.5-12 dBm (using 0-5.5 dB loss) and varying Raman gain 34 from 1-16 dB. All of this can be achieved in a practical system with available components.

Figure 4:
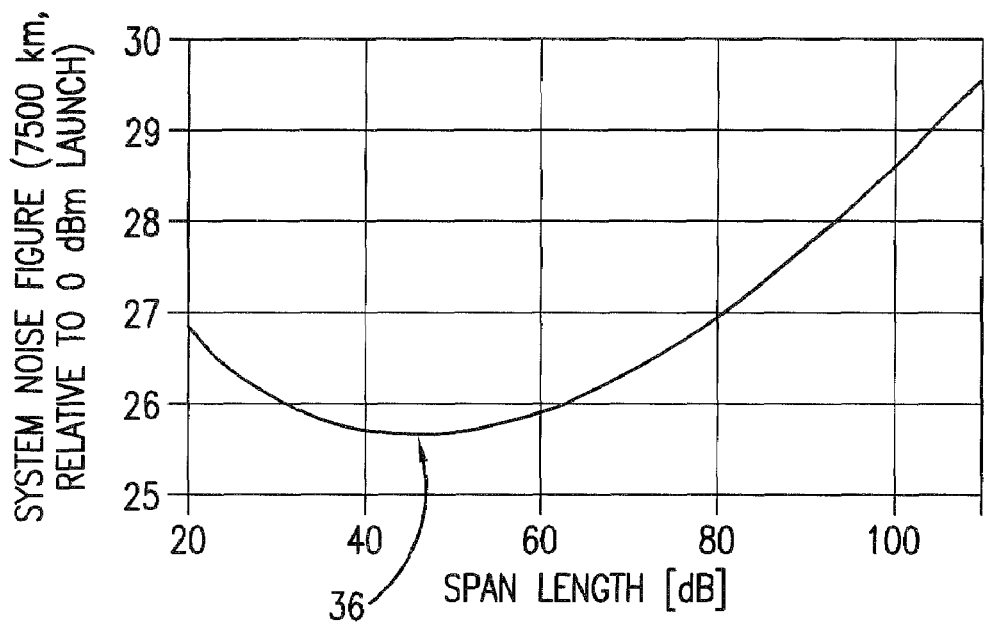
FIG. 4 is a graph showing system a noise figure for a 7500 km system as a function of span length.

Turning now to FIG. 4, which illustrates the system noise figure versus span length (dB), this Figure shows the received SNR scales directly with the system noise figure. As shown at data point 36, 45 km spans give the best performance using this design. The difference between effective noise figures of 45 km spans and 110 km spans is less than 4 dB, and the difference between 45 km spans and 85 km spans (typical average span length for terrestrial routes) is less than 2 dB. Therefore, it has been discovered that this design enables transmission over ULH terrestrial systems with widely distributed span lengths (averaging 85 km) with an SNR impairment of less than 2 dB compared to a system consisting of 45 km spans (similar to a submarine system).

Thus, one advantage of the present invention is that the preferred system design makes a terrestrial link look and behave like a traditional long-haul or ULH undersea link. One code of (single stage) EDFAs is used with varying output loss to launch the optimum power into each span regardless of length. The Raman gain is adjusted so that each EDFA has substantially the same input power. This concept minimizes system degradation from wide span loss distributions and allows generic repeaters to be manufactured and used in all systems of the same generation (capacity).

It will be apparent to those skilled in the art that various modifications and variations can be made in the Raman assisted EDFA module of the present invention without departing from the spirit or scope of the invention. Thus, it is intended that the present invention cover the modifications and variations of this invention provided they come within the scope of the appended claims and their equivalents.

What is claimed is:

1. An optical communication system comprising:
   a transmitter for transmitting an optical signal;
   a receiver for detecting said optical signal; and
   an optical fiber communications link interposed between said transmitter and said receiver, said optical fiber communications link comprising:
      a plurality of optical fiber spans of varying span lengths and span loss coupled between said transmitter and said receiver; and
      a plurality of Raman assisted EDFA hybrid amplifiers, each being associated with a different one of said spans and having a Raman amplifier variable gain portion, an EDFA gain portion, and an optical attenuator coupled to an output of said EDFA gain portion, each of said EDFA gain portions being configured to provide substantially the same gain as each of the others of said EDFA gain portions,
         wherein each of said Raman amplifier variable gain portions is configured to provide a different associated gain compared to each of the others of said Raman amplifier variable gain portions whereby each of said EDFA gain portions of said plurality of Raman assisted EDFA hybrid amplifiers has substantially the same total input power as each of the others of said EDFA gain portions of said plurality of Raman assisted EDFA hybrid amplifiers throughout said optical fiber communications link regardless of said varying span lengths and span loss.

2. The system of claim 1 further comprising at least one dispersion-compensation fiber disposed between at least one of said Raman amplifier variable gain portions and at least one of said EDFA gain portions.

3. The system of claim 1 further comprising at least one dispersion-compensation fiber disposed within at least one of said Raman amplifier variable gain portions.

4. The system of claim 1 wherein at least one of said EDFA gain portions comprises a multi-stage EDFA.

5. The system of claim 4 further comprising a least one dispersion-compensation fiber disposed between stages of said multi-stage EDFA.

6. The system of claim 1 wherein said optical attenuator of each said plurality of Raman assisted EDFA hybrid amplifiers is configured to reduce the output power of said EDFA gain portion.

7. The system of claim 6 wherein said optical attenuators are configured for reducing the output power of said EDFA gain portions in 1 dB increments.

8. The system of claim 1 wherein said optical attenuator of each said plurality of Raman assisted EDFA hybrid amplifiers is configured to reduce the output power of said EDFA gain portion to provide an optimum power to be launched into the next adjacent Raman assisted EDFA hybrid amplifier.

9. The system of claim 1 wherein said optical fiber span lengths range from about 30 to about 110 km.

10. A method of amplifying an optical signal on an optical fiber communication link including plurality of optical fiber spans of varying span lengths and span loss, said method comprising:

provising a plurality of Raman assisted EDFA hybrid amplifiers, each being associated with a different one of said spans and having a Raman amplifier variable gain portion, an EDFA gain portion, and an optical attenuator coupled to an output of said EDFA gain portion each of said EDFA gain portions being configured to provide substantially the same gain as each of the others of said EDFA gain portions;

configuring said Raman amplifier variable gain portions to provide a different associated gain compared to each of the others of said Raman amplifier variable gain portions whereby each of said EDFA gain portions of said plurality of Raman assisted EDFA hybrid amplifiers has substantially the same total input power as each of the others of said EDFA gain portions of said plurality of Raman assisted EDFA hybrid amplifiers regardless of said varying span lengths and span loss;

transmitting said optical signal on said optical fiber communications link through each of said Raman assisted EDFA hybrid amplifiers;

amplifying said optical signal through each of said Raman amplifier variable gain portions;

amplifying said optical signal through each of said EDFA gain portions; and attenuating output power of said EDFA gain portions.

11. The method of claim 10 wherein said attenuating the output power of said EDFA gain portions comprises adding a predetermined loss to the output of each of said EDFA gain portions, whereby the launch power into the next Raman assisted EDFA hybrid amplifier is optimized.

* * * * *